US012729995B2

(12) United States Patent
Cheng et al.

(10) Patent No.: US 12,729,995 B2
(45) Date of Patent: Sep. 8, 2026

(54) INFRARED VISION POSITIONING METHOD FOR CONCRETE PUMPING LIQUID LEVEL IN TUBE OF STEEL TUBULAR ARCH BRIDGE

(71) Applicant: Chongqing Jiaotong University, Chongqing (CN)

(72) Inventors: Chongsheng Cheng, Chongqing (CN); Jie Yu, Chongqing (CN); Jianting Zhou, Chongqing (CN); Haonan Cai, Chongqing (CN); Shaorui Wang, Chongqing (CN); Bo Huang, Chongqing (CN); Ligui Yang, Chongqing (CN)

(73) Assignee: Chongqing Jiaotong University, Chongqing (CN)

( * ) Notice: Subject to any disclaimer, the term of this patent is extended or adjusted under 35 U.S.C. 154(b) by 186 days.

(21) Appl. No.: 18/900,885

(22) Filed: Sep. 29, 2024

(65) Prior Publication Data

US 2025/0244160 A1 Jul. 31, 2025

(30) Foreign Application Priority Data

Jan. 30, 2024 (CN) ........................ 202410125151.3

(51) Int. Cl.

| | |
|---|---|
| ***G01F 23/292*** | (2006.01) |
| ***G01F 25/20*** | (2022.01) |
| ***G06T 3/60*** | (2006.01) |
| ***G06T 7/73*** | (2017.01) |
| ***G06T 7/80*** | (2017.01) |

(Continued)

(52) U.S. Cl.

CPC ............ *G01F 23/292* (2013.01); *G01F 25/20* (2022.01); *G06T 3/60* (2013.01); *G06T 7/73* (2017.01); *G06T 7/80* (2017.01); *H04N 17/002* (2013.01); *H04N 23/23* (2023.01); *H04N 23/67* (2023.01); *H04N 23/695* (2023.01); *G06T 2207/10048* (2013.01); *G06T 2207/30244* (2013.01)

(58) Field of Classification Search

None

See application file for complete search history.

(56) References Cited

FOREIGN PATENT DOCUMENTS

| | | | |
|---|---|---|---|
| CN | 106097300 A * | 11/2016 | |
| CN | 110807809 A * | 2/2020 | ............... G06T 7/80 |

(Continued)

*Primary Examiner* — Jiangeng Sun

(74) *Attorney, Agent, or Firm* — Bayramoglu Law Offices LLC

(57) ABSTRACT

An infrared vision positioning method for concrete pumping liquid level in tube of steel tubular arch bridge is provided. In this method, the perspective geometry algorithm is used to construct the pose transformation matrix to obtain the relative pose between the camera and the arch bridge steel pipe, the image is transformed into orthography by perspective transformation, and the real coordinates of the liquid level in the infrared image can be directly solved by the scale, so as to realize the accurate positioning of the liquid level; the proposed method is simple in structure and can realize real-time operation, which greatly improves the calculation efficiency of coordinates in infrared images, compared with the conventional knocking method, the advantage is that it does not require staff in an overhead operating, and the feedback of the liquid level position can be faster and more efficient.

9 Claims, 4 Drawing Sheets

(51) Int. Cl.

| | |
|---|---|
| ***H04N 17/00*** | (2006.01) |
| ***H04N 23/23*** | (2023.01) |
| ***H04N 23/67*** | (2023.01) |
| ***H04N 23/695*** | (2023.01) |

(56) References Cited

FOREIGN PATENT DOCUMENTS

| | | | | | |
|---|---|---|---|---|---|
| CN | 109405765 B | * | 11/2020 | ............. | G01B 11/22 |
| CN | 110030979 B | * | 11/2020 | ............. | G06T 7/187 |
| CN | 214089521 U | * | 8/2021 | | |
| CN | 116695577 A | * | 9/2023 | ............. | E01D 21/00 |

* cited by examiner image after orthographic transformation

INFRARED VISION POSITIONING METHOD FOR CONCRETE PUMPING LIQUID LEVEL IN TUBE OF STEEL TUBULAR ARCH BRIDGE

CROSS REFERENCE TO THE RELATED APPLICATIONS

This application is based upon and claims priority to Chinese Patent Application No. 202410125151.3, filed on Jan. 30, 2024, the entire contents of which are incorporated herein by reference.

TECHNICAL FIELD

The present invention relates to the construction technology field of concrete filled steel tubular arch bridge, specifically an infrared vision positioning method for a concrete pumping liquid level in a tube of a steel tubular arch bridge.

BACKGROUND

In order to ensure that the concrete in the main arch of concrete filled steel tubular arch bridge is dense without void, the pumping jacking method of concrete filled steel tubular is one of the main construction methods. However, the concrete filled steel tubular is a closed environment, so it is impossible to directly observe the liquid level position of the concrete in the tube. The existing technology often uses the knocking method, the opening observation method, the pressure sensor method, and other methods to detect the liquid level position of the concrete in the tube to feedback the real liquid level position (the world coordinate system of the bridge) to the site construction staff, but in practical applications, the knocking method and the opening observation method require staff in an overhead operating, which is time-consuming and labor-intensive, low construction efficiency, and may also cause man-made damage to the structure; the pressure sensor is greatly affected by the instability of the concrete liquid level and the bending of the tube shape, and the liquid level position cannot be stably measured. Therefore, an intelligent liquid level positioning method is necessary to achieve remote, safe, fast and accurate liquid level positioning. Infrared thermal imaging technology is an intelligent method for real-time monitoring of the pumping process of concrete filled steel tubular, there is a temperature mutation area near the liquid level position due to the hydration of concrete in the tube, the liquid level position can be distinguished by observing the infrared image. However, the existing monitoring method for concrete pumping liquid level in steel tubular arch bridge based on infrared imaging still has the following technical defects: there will be a problem of unequal image pixel scale caused by oblique photography when the infrared device is not arranged in parallel with the arch bridge (monitoring object), thereby the liquid level coordinate transformation (to the world coordinate system) directly through the image will have a large error, which makes the accuracy of liquid level positioning low and can not meet the requirements of construction monitoring.

Therefore, we propose an infrared vision positioning method for concrete pumping liquid level in tube of steel tubular arch bridge to solve the above technical problems.

SUMMARY

(1) Technical Problems to be Solved

In view of the shortcomings of the existing technology, the present invention provides an infrared vision positioning method for a concrete pumping liquid level in a tube of a steel tubular arch bridge, which has the advantages of quickly and non-destructively positioning the liquid level position of the concrete filled steel tubular in real-time and accurately, so that the construction staff can intuitively describe the specific position of the liquid level at this time, and solve the above technical problems.

(2) Technical Scheme

In order to realize the quickly and non-destructively positioning the liquid level position of the concrete filled steel tubular in real-time and accurately, so that the construction staff can intuitively describe the specific position of the liquid level at this time, the present invention provides the following technical scheme: an infrared vision positioning method for concrete pumping liquid level in tube of steel tubular arch bridge, comprising the following steps:

- step 1: using a calibration plate to calibrate an infrared thermal imaging camera, and obtaining an intrinsic matrix K and a distortion parameter D of the infrared thermal imaging camera;
- step 2: setting up the infrared thermal imaging camera and adjusting an orientation of the infrared thermal imaging camera, wherein a half of the steel tubular arch bridge from a pumping port to a top of an arch is comprised in an infrared thermal imaging picture before a concrete pumping construction, and adjusting a focal length and related parameters to make the infrared thermal imaging picture clear and stable;
- step 3: turning on the infrared thermal imaging camera to collect an image after starting the pumping of a concrete filled steel tubular, due to a slow rise of a liquid level, collecting a frame image at intervals of 1 min, and performing a distortion correction on collected images;
- step 4: importing a coordinate of a feature point, and solving a camera pose at a first current time by a perspective decoupling (PNP) algorithm to obtain a camera pose matrix [R|T], and transforming a world coordinate of the feature point into a camera coordinate system $O_c$;
- step 5: obtaining a matrix [C|t] by inverting a [R|T] matrix, constructing a pose transformation matrix $[W_1]$ according to a rotation matrix C and performing a rotation transformation on the camera coordinate system $O_c$ to obtain a camera coordinate system $$O_c',$$

constructing a pose transformation matrix $[W_2]$ by a translation vector t at a second current time, and translating the camera coordinate system $$O_c'$$

to a front of a world coordinate system by a translation transformation of the camera coordinate system $$O_c';$$

step 6: projecting the feature point onto a camera plane by an orthographic projection to obtain a 2D orthographic projection coordinate of the feature point;

step 7: transforming a pixel coordinate of a feature point under a default pixel coordinate system $O_p$ into a pixel coordinate system $$O'_p$$

with the world coordinate system as an origin;

step 8: obtaining a perspective transformation matrix P by a one-to-one correspondence between the 2D orthographic projection coordinate and a 2D pixel coordinate in the pixel coordinate system $$O'_p$$

coordinate system;

step 9: performing a perspective transformation on an arch bridge image of a current frame to obtain an orthographic projection arch bridge image;

step 10: calculating an image pixel scale S=L/d;

step 11: detecting a liquid level position on the orthographic projection arch bridge image by a target detection algorithm, and returning to the default pixel coordinates of the liquid level; and step 12: transforming the default pixel coordinates of the liquid level into a real coordinate system of the liquid level with an arch foot of the steel tubular arch bridge as the origin, calculating a mileage x and an elevation y of the liquid level at this time by the image pixel scale to complete positioning.

Preferably, the specific steps of the step 1 are as follows:

A1, placing a special calibration plate in a required shooting position to ensure that the special calibration plate fully occupies a field of view of feature points in a camera imaging area;

A2, using the infrared thermal imaging camera to shoot the special calibration plate in turn, shooting more than 5 calibration plate images;

A3, calculating coordinates of the feature points on the special calibration plate in each of the calibration plate images by extracting the feature points of each of the calibration plate images;

A4, using a random sample consensus (RANSAC) algorithm to match the feature points, and calculating world coordinates of a 3D space corresponding to the feature points in each of the calibration plate image; and A5, using obtained 3D feature point coordinates and 2D feature point image coordinates to calculate the intrinsic matrix K and the distortion parameter D of the infrared thermal imaging camera by using a calibration algorithm.

Preferably, the specific steps of the step 4 are as follows:

B1, assuming that 3D world coordinates of n (n≥3) feature points on an arch bridge plane be $P_1, P_2, \ldots, P_n$ and corresponding 2D pixel coordinates be $p_1, p_2, \ldots, p_n$; and B2, solving a pose transformation matrix [R|T] representing a transformation from an arch bridge world coordinate system $O_w$ to the camera coordinate system $O_c$ by the intrinsic matrix K of the infrared thermal imaging camera and an elimination ratio $Z_c$, a solution formula is as follows:

$$Zc\begin{bmatrix} u \\ v \\ 1 \end{bmatrix} = K[R \mid T]\begin{bmatrix} X_w \\ Y_w \\ Z_w \end{bmatrix}$$

where R is a rotation matrix and T is a translation vector.

Preferably, in step 4, points in the arch bridge world coordinate system $O_w$ are rotated and translated transformation, and world coordinates of 3D points are transformed into the camera coordinate system $O_c$, an expression is as follows:

$$\begin{bmatrix} X_c \\ Y_c \\ Z_c \end{bmatrix} = [R \mid T]\begin{bmatrix} X_w \\ Y_w \\ Z_w \end{bmatrix}$$

Preferably, in step 5, the [R|T] matrix is inverted to obtain the matrix [C|t], and the camera coordinate system $O_c$ is performed the rotation transformation to obtain the camera coordinate system $$O'_c$$

in a same direction as $X_w$, $Y_w$, and $Z_w$ axes of the arch bridge world coordinate system $O_w$, a first calculation expression is as follow:

$$\begin{bmatrix} X'_c \\ Y'_c \\ Z'_c \end{bmatrix} = [W_1]\begin{bmatrix} X_c \\ Y_c \\ Z_c \end{bmatrix}$$

Preferably, in step 5, the translation transformation is performed on the camera coordinate system $$O'_c$$

to obtain a final camera coordinate system $$O''_c,$$

and a rotated camera coordinate system is translated to the front of the world coordinate system, a second calculation expression is as follows:

$$\begin{bmatrix} X''_c \\ Y''_c \\ Z''_c \end{bmatrix} = [W_2]\begin{bmatrix} X'_c \\ Y'_c \\ Z'_c \end{bmatrix}$$

Preferably, in step 7, default pixel coordinates of the origin of the world coordinate system and feature points of the steel tubular arch bridge are $(u_0, v_0)$ and $(u_i, v_i)$ respectively, the default pixel coordinate system $O_p$ is transformed to the pixel coordinate system $$O_p',$$

wherein the 2D pixel coordinates in the pixel coordinate system $$O_p'$$

correspond to the 2D orthographic projection coordinates one by one, a third calculation expression is as follows:

$$\begin{cases} u_i' = u_i - u_0 \\ v_i' = v_0 - v_i \end{cases}$$

Preferably, in step 8 and step 9, according to an one-to-one correspondence between the 2D pixel coordinates before and after a camera pose transformation, the perspective transformation matrix P is obtained, and the perspective transformation is performed on the arch bridge image taken by the infrared thermal imaging camera in the current frame, wherein an original oblique image is transformed into an orthographic projection of the arch bridge image.

Preferably, in step 12, the default pixel coordinate system $O_p$ is transformed into a liquid level coordinate system $O_l$ with the arch foot of the steel tubular arch bridge as the origin, and liquid level pixel coordinates after a coordinate transformation are multiplied by the image pixel scale, wherein the liquid level pixel coordinates are returned to real world coordinates, so as to feedback the mileage x and the elevation y of the liquid level, a fourth calculation expression is as follows:

$$\begin{cases} x = (u - u_0)S \\ y = (v_0 - v)S \end{cases}$$

Compared with the existing technology, the present invention provides an infrared vision positioning method for concrete pumping liquid level in tube of steel tubular arch bridge, which has the following beneficial effects:

the present invention aims at the problem that it is difficult to accurately measure the real distance in the oblique photography image in the existing technology, the PNP algorithm is used to construct the pose transformation matrix to obtain the pose of the camera's orthographic arch bridge steel tube, the perspective transformation transforms the arch bridge image of oblique photography into orthography, the scale of each pixel in the image is the same at this time, and the real distance between two points in the image can be directly measured by the scale, and the PNP algorithm has a simple structure and fast operation speed, which greatly improves the efficiency of measuring the real distance of the image. The accurate positioning of the liquid level position is realized by changing the camera pose and orthographic projection image, compared with the conventional knocking method, the advantage is that it does not require staff in an overhead operating, and the feedback of the liquid level position can be faster and more efficient, it not only improves the safety of the construction process, but also realizes non-destructive monitoring to avoid damage to the structure; compared with the direct infrared imaging method, the advantage is that the liquid level is determined by machine vision more accurately than the human eye, and the problem of large error caused by the direct measurement of the liquid level in the image is solved.

DETAILED DESCRIPTION OF THE EMBODIMENTS

The following clearly and completely describes the technical solutions in embodiments of the present invention with reference to the drawings of embodiments of the present invention. Apparently, the described embodiments are only some but not all of the embodiments of the present invention. All other embodiments obtained by those of ordinary skill in the art based on the embodiments of the present invention without involving any creative effort shall fall within the scope of protection of the present invention.

The present invention proposes an infrared vision positioning method for concrete pumping liquid level in tube of steel tubular arch bridge, the machine vision measurement system is constructed by calibrating the infrared thermal imaging camera instead of the human eye, the pose estimation algorithm and the orthographic projection transformation are used to accurately detect the liquid level position and calculate the real world coordinates of the liquid level at this time. This method can quickly and non-destructively position the liquid level position of the concrete filled steel tubular in real time and accurately, so that the construction staff can intuitively describe the specific position of the liquid level at this time. This method can greatly improve the construction efficiency and safety, and the implementation process has no damage to the structure, and the monitoring results are intuitive and accurate.

Embodiment 1

Figure 1:
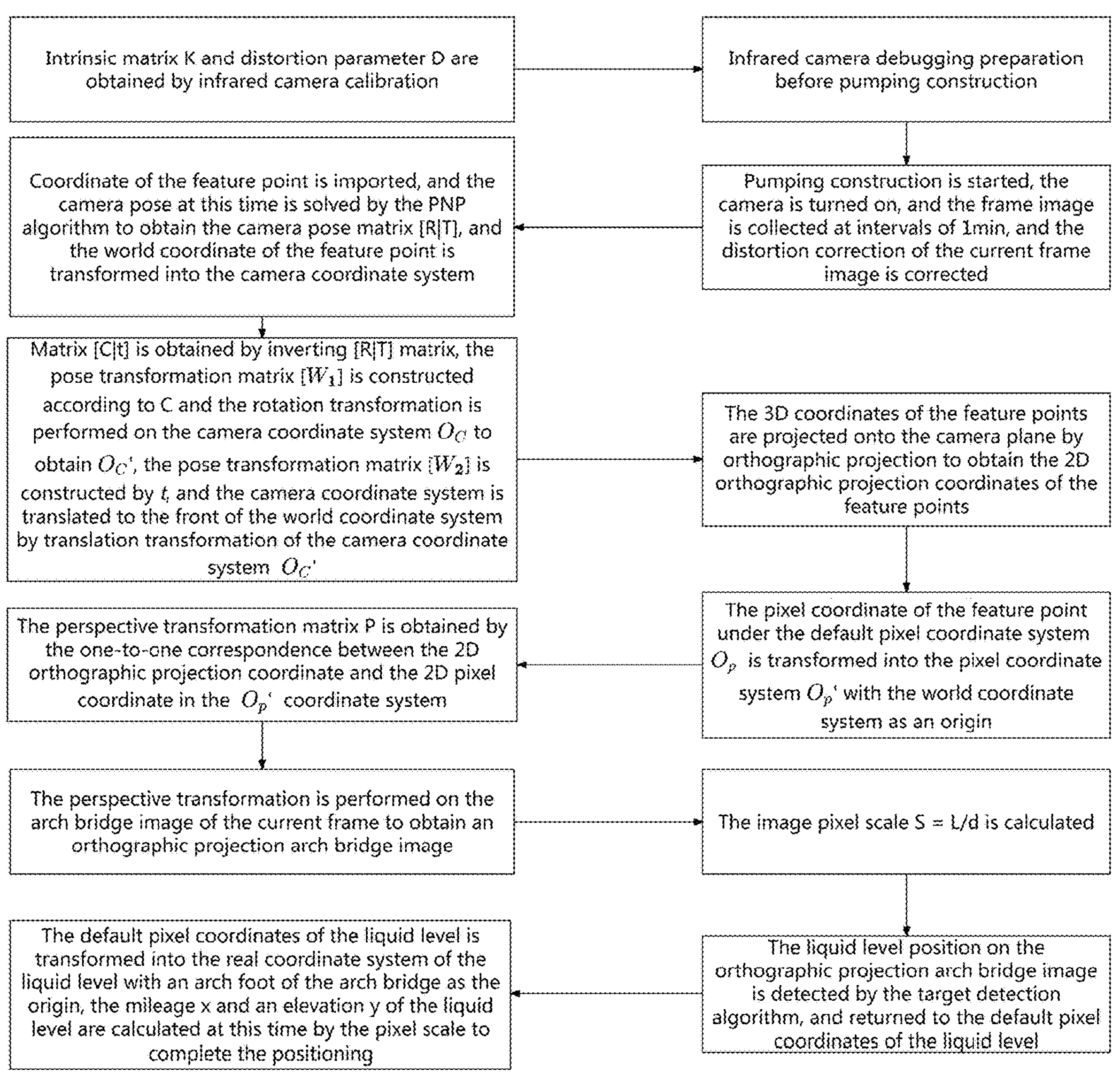
FIG. 1 is a flow chart of a monitoring method for position coordinates of a pumping liquid level of concrete filled steel tubular in the present invention.
Figure 2:
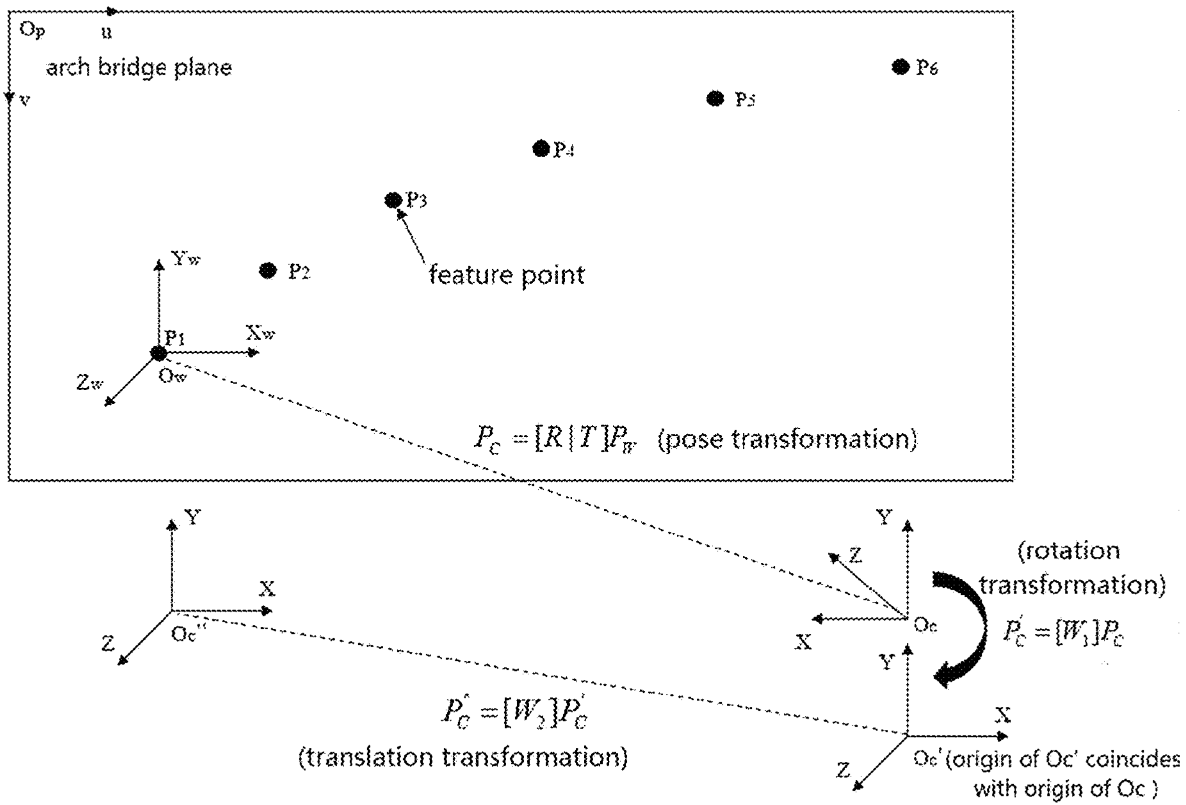
FIG. 2 is a schematic diagram of a camera pose transformation of embodiment 1 in the present invention.
Figure 3:
FIG. 3 is an image effect diagram of an arch bridge after orthographic obtained in embodiment 1 in the present invention.
Figure 3:
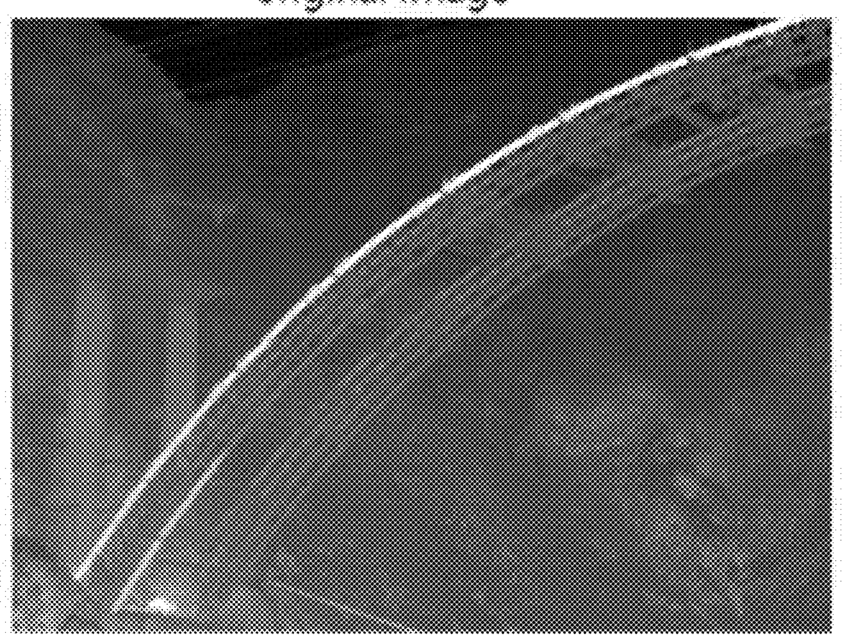
Figure 3:
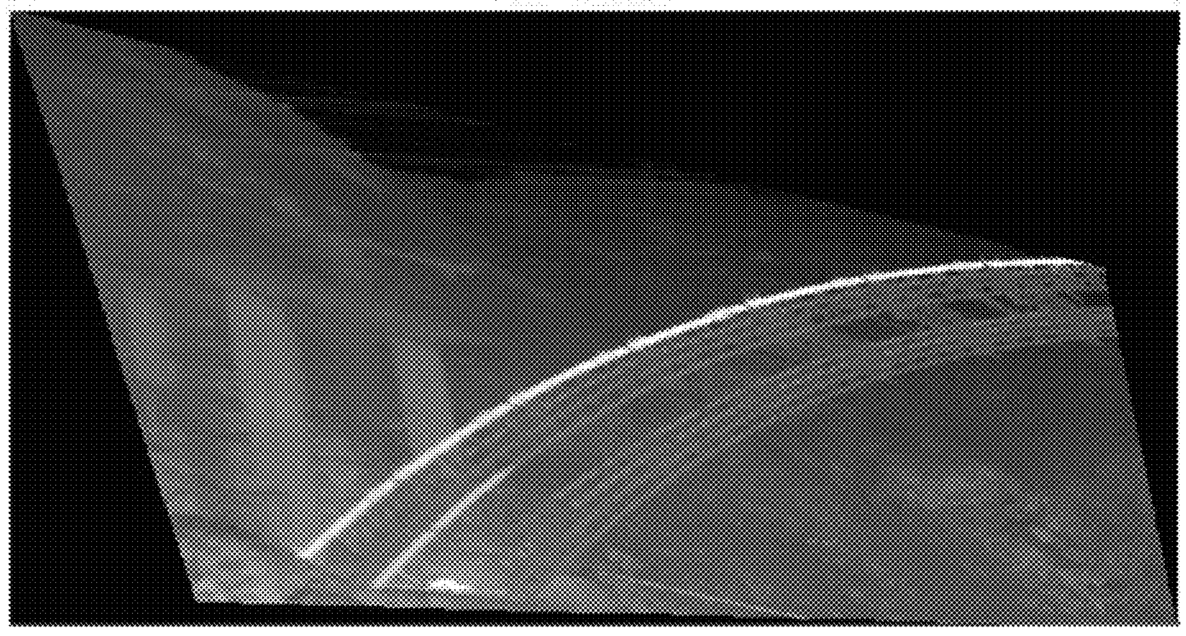

An appropriate point is selected and the camera is set up and the camera orientation is adjusted so that half of the arch bridge from a pumping port to a top of the arch is comprised in an infrared thermal imaging picture before the concrete pumping construction, and then a focal length and related parameters are adjusted to make the picture clear and stable. The camera is turned on to collect an image after starting the pumping of concrete filled steel tubular, due to the slow rise of a liquid level, a frame image is collected at intervals of 1 min, and a distortion correction is performed on the collected images. FIG. 2 shows that six column points on the arch bridge are selected as the feature points, and the world coordinate $$P_W = \begin{bmatrix} x_{wi} \\ y_{wi} \\ z_{wi} \end{bmatrix},$$

the corresponding default pixel coordinates are $$\begin{bmatrix} u_i \\ v_i \end{bmatrix},$$

i=1, 2, 3, 4, 5, 6; the intrinsic matrix K of camera and a scale coefficient Zc are used to solve the pose matrix [R|T] of the camera at this time by the formula $$Zc\begin{bmatrix} u_i \\ v_i \\ 1 \end{bmatrix} = K[R \mid T]\begin{bmatrix} x_{wi} \\ y_{wi} \\ z_{wi} \end{bmatrix};$$

then, the world coordinates of the feature points are transformed into the camera coordinate system $O_c$ by the formula $$\begin{bmatrix} x_{ci} \\ y_{ci} \\ z_{ci} \end{bmatrix} = [R \mid T]\begin{bmatrix} x_{wi} \\ y_{wi} \\ z_{wi} \end{bmatrix},$$

and the camera coordinate $$PC = \begin{bmatrix} x_{ci} \\ y_{ci} \\ z_{ci} \end{bmatrix}$$

of the feature points is obtained, the matrix [C|t] is obtained by inverting the matrix [R|T], according to the rotation matrix C at this time, the pose transformation matrix $[W_1]$ is constructed, and the coordinate $$\begin{bmatrix} x_{ci} \\ y_{ci} \\ z_{ci} \end{bmatrix}$$

is performed the rotation transformation by the formula $$\begin{bmatrix} x'_{ci} \\ y'_{ci} \\ z'_{ci} \end{bmatrix} = [W_1]\begin{bmatrix} x_{ci} \\ y_{ci} \\ z_{ci} \end{bmatrix}$$

to obtain the coordinate $$\begin{bmatrix} x'_{ci} \\ y'_{ci} \\ z'_{ci} \end{bmatrix}$$

of the feature point under the camera coordinate system $$O'_c$$

in the same direction as the world coordinate system $X_w$, $Y_w$, and $Z_w$ axes, the pose transformation matrix $[W_2]$ is constructed by a translation vector t at this time, then, the final camera coordinate system $$O''_c$$

is obtained by the translation transformation of the camera coordinate system $$O'_c$$

by formula $$\begin{bmatrix} x''_{ci} \\ y''_{ci} \\ z''_{ci} \end{bmatrix} = [W_2]\begin{bmatrix} x'_{ci} \\ y'_{ci} \\ z'_{ci} \end{bmatrix},$$

the rotated camera coordinate system is translated to the front of the world coordinate system, so as to obtain the coordinate $$\begin{bmatrix} x''_{ci} \\ y''_{ci} \\ z''_{ci} \end{bmatrix}$$

of the six 3D points on the arch bridge under the camera coordinate system $$O''_c$$

when the camera is orthographic arch bridge, finally, the 2D pixel coordinates $$\begin{bmatrix} u_x \\ v_y \end{bmatrix}$$

of the six 3D points on the camera plane are obtained by orthographic projection, the pixel coordinate system $O_p$ is transformed into $$O'_p$$

by the formula $$\begin{cases} u'_i = u_i - u_0 \\ v'_i = v_0 - v_i \end{cases},$$

and the 2D pixel coordinate $$\begin{bmatrix} u'_i \\ v'_i \end{bmatrix}$$

in the coordinate system $$O'_p$$

is one-to-one corresponding to the 2D coordinate $$\begin{bmatrix} u_x \\ v_y \end{bmatrix}$$

of the orthographic projection; according to the correspondence between the 2D pixel coordinates before and after the pose transformation, the perspective transformation matrix P is obtained, and the perspective transformation is performed on the current frame image, so that the original tilted image is transformed into an orthographic arch bridge image. FIG. 3 shows the effect diagram of using the above calculation method to transform the arch bridge image of oblique photography into an orthographic image.

Embodiment 2

On the arch bridge image after orthographic transformation, the feature points $P_1$ and $P_4$ are selected to calculate the scale of the image after perspective transformation, where the world coordinates and default pixel coordinates of $P_1$ are $$\begin{bmatrix} x_{w1} \\ y_{w1} \\ z_{w1} \end{bmatrix} = \begin{bmatrix} 0 \\ 0 \\ 0 \end{bmatrix} \text{ and } \begin{bmatrix} u_1 \\ v_1 \end{bmatrix} = \begin{bmatrix} 182 \\ 798 \end{bmatrix},$$

respectively, and the world coordinates and pixel coordinates of $P_4$ are $$\begin{bmatrix} x_{w4} \\ y_{w4} \\ z_{w4} \end{bmatrix} = \begin{bmatrix} 981 \\ 516 \\ 0 \end{bmatrix} \text{ and } \begin{bmatrix} u_4 \\ v_4 \end{bmatrix} = \begin{bmatrix} 1099 \\ 316 \end{bmatrix},$$

respectively, then the image scale is $$S = L/d = \left| \frac{981 - 0}{1099 - 182} \right| = 1.07 \text{ dm/pixel}.$$

Figure 4:
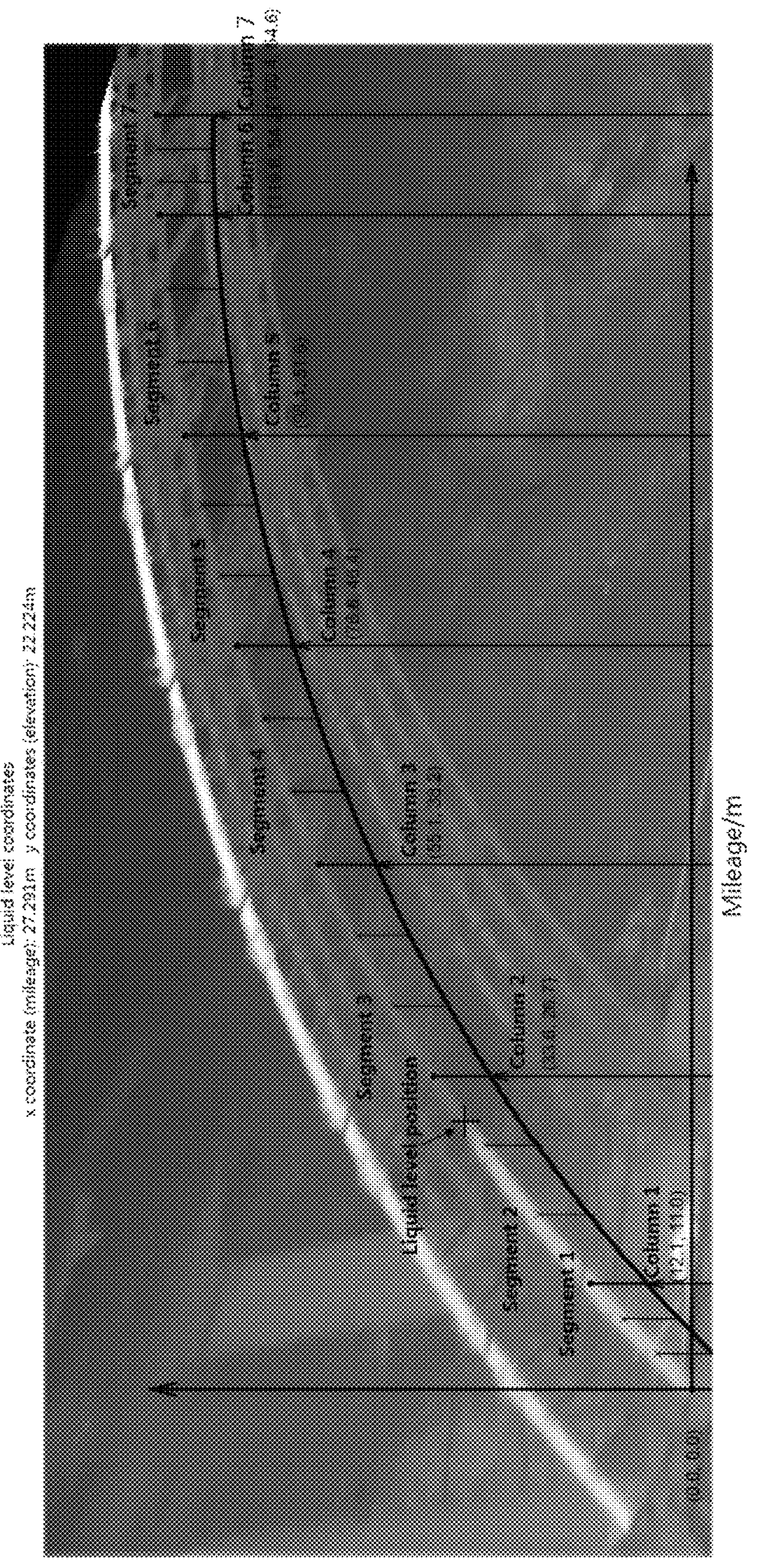
FIG. 4 is a liquid level coordinate feedback effect diagram in embodiment 2 in the present invention.

The liquid level is positioned by the pixel scale, the default pixel coordinate of the origin of the real coordinate system of the liquid level $O_l$ is $$\begin{bmatrix} u_0 \\ v_0 \end{bmatrix} = \begin{bmatrix} u_1 \\ v_1 \end{bmatrix} = \begin{bmatrix} 182 \\ 798 \end{bmatrix},$$

and the default pixel coordinate of the liquid level is $$\begin{bmatrix} u \\ v \end{bmatrix} = \begin{bmatrix} 438 \\ 591 \end{bmatrix},$$

the mileage of the liquid level is $x=(u-u_0)S=(438-182)\times 1.07\approx 273.92$ dm $=27.392$ m, and the elevation is $y=(v_0-v)S=(798-591)\times 1.07\approx 221.49$ dm $=22.149$ m, FIG. 4 shows the liquid level coordinate feedback effect diagram after the liquid level is positioned by the above calculation method.

In summary, the method proposed in this present invention can quickly and non-destructively monitor the liquid level of concrete filled steel tubular in real time, this method can make the scale of each pixel in the image the same, and the real distance between the two points in the image can be directly measured by the scale at this time, and the algorithm has a simple structure and fast operation speed, which greatly improves the efficiency of measuring the real distance of the image. The accurate positioning of the liquid level position is realized by attitude calculation and orthographic projection image, compared with the conventional knocking method, the advantage is that it does not require staff in an overhead operating, and the feedback of the liquid level position can be faster and more efficient, it not only improves the safety of the construction process, but also realizes non-destructive monitoring to avoid damage to the structure; compared with the direct infrared imaging method, the advantage is that the liquid level is determined by machine vision more accurately than the human eye, and the problem of large error caused by the direct measurement of the liquid level in the image is solved, accurate liquid level measurement can be achieved even in the case of oblique photography by using the method of the present invention.

Although the embodiments of the present invention have been shown and described, for ordinary technicians in this field, it can be understood that these embodiments can be changed, modified, replaced and modified without breaking away from the principle and spirit of the present invention. The scope of the present invention is limited by the attached claims and their equivalents.

What is claimed is:

1. An infrared vision positioning method for a concrete pumping liquid level in a tube of a steel tubular arch bridge, comprising the following steps:

step 1: using a calibration plate to calibrate an infrared thermal imaging camera, and obtaining an intrinsic matrix K and a distortion parameter D of the infrared thermal imaging camera;

step 2: setting up the infrared thermal imaging camera and adjusting an orientation of the infrared thermal imaging camera, wherein a half of the steel tubular arch bridge from a pumping port to a top of an arch is comprised in an infrared thermal imaging picture before a concrete pumping construction, and adjusting a focal length and related parameters to make the infrared thermal imaging picture clear and stable;

step 3: turning on the infrared thermal imaging camera to collect an image after starting a pumping of a concrete filled steel tubular, due to a slow rise of a liquid level, collecting a frame image at intervals of 1 min, and performing a distortion correction on collected images;

step 4: importing a coordinate of a feature point, and solving a camera pose at a first current time by a perspective decoupling (PNP) algorithm to obtain a camera pose matrix [R|T], and transforming a world coordinate of the feature point into a camera coordinate system $O_c$;

step 5: obtaining a matrix [C|t] by inverting a [R|T] matrix, constructing a pose transformation matrix $[W_1]$ according to a rotation matrix C and performing a rotation transformation on the camera coordinate system $O_c$ to obtain a camera coordinate system $$O'_c,$$

constructing a pose transformation matrix $[W_2]$ by a translation vector t at a second current time, and translating the camera coordinate system $$O'_c$$

to a front of a world coordinate system by a translation transformation of the camera coordinate system $$O'_c;$$

step 6: projecting the feature point onto a camera plane by an orthographic projection to obtain a 2D orthographic projection coordinate of the feature point;

step 7: transforming a pixel coordinate of a feature point under a default pixel coordinate system $O_p$ into a pixel coordinate system $$O'_p$$

with the world coordinate system as an origin;

step 8: obtaining a perspective transformation matrix P by a one-to-one correspondence between the 2D orthographic projection coordinate and a 2D pixel coordinate in the pixel coordinate system $$O'_p;$$

step 9: performing a perspective transformation on an arch bridge image of a current frame to obtain an orthographic projection arch bridge image;

step 10: calculating an image pixel scale S=L/d;

step 11: detecting a liquid level position on the orthographic projection arch bridge image by a target detection algorithm, and returning to default pixel coordinates of the liquid level; and step 12: transforming the default pixel coordinates of the liquid level into a real coordinate system of the liquid level with an arch foot of the steel tubular arch bridge as the origin, calculating a mileage x and an elevation y of the liquid level at a third current time by the image pixel scale to complete positioning.

2. The infrared vision positioning method for the concrete pumping liquid level in the tube of the steel tubular arch bridge according to claim 1, wherein steps of the step 1 are as follows:

A1, placing a special calibration plate in a required shooting position to ensure that the special calibration plate fully occupies a field of view of feature points in a camera imaging area;

A2, using the infrared thermal imaging camera to shoot the special calibration plate in turn, shooting more than 5 calibration plate images;

A3, calculating coordinates of the feature points on the special calibration plate in each of the calibration plate images by extracting the feature points of each of the calibration plate images;

A4, using a random sample consensus (RANSAC) algorithm to match the feature points, and calculating world coordinates of a 3D space corresponding to the feature points in each of the calibration plate images; and A5, using obtained 3D feature point coordinates and 2D feature point image coordinates to calculate the intrinsic matrix K and the distortion parameter D of the infrared thermal imaging camera by using a calibration algorithm.

3. The infrared vision positioning method for the concrete pumping liquid level in the tube of the steel tubular arch bridge according to claim 2, wherein steps of the step 4 are as follows:

B1, assuming that 3D world coordinates of n (n≥3) feature points on an arch bridge plane be $P_1, P_2, \ldots, P_n$ and corresponding 2D pixel coordinates be $p_1, p_2, \ldots, p_n$; and B2, solving a pose transformation matrix [R|T] representing a transformation from an arch bridge world coordinate system $O_w$ to the camera coordinate system $O_c$ by the intrinsic matrix K of the infrared thermal imaging camera and an elimination ratio $Z_c$, a solution formula is as follows:

$$Zc\begin{bmatrix} u \\ v \\ 1 \end{bmatrix} = K[R \mid T]\begin{bmatrix} X_w \\ Y_w \\ Z_w \end{bmatrix}$$

where R is a rotation matrix and T is a translation vector.

4. The infrared vision positioning method for the concrete pumping liquid level in the tube of the steel tubular arch bridge according to claim 3, wherein in the step 4, points in the arch bridge world coordinate system $O_w$ are performed a pose transformation, and world coordinates of 3D points are transformed into the camera coordinate system $O_c$, an expression is as follow:

$$\begin{bmatrix} X_c \\ Y_c \\ Z_c \end{bmatrix} = [R \mid T]\begin{bmatrix} X_w \\ Y_w \\ Z_w \end{bmatrix}.$$

5. The infrared vision positioning method for the concrete pumping liquid level in the tube of the steel tubular arch bridge according to claim 4, wherein in the step 5, the [R|T] matrix is inverted to obtain the matrix [C|t], and the camera coordinate system $O_c$ is performed the rotation transformation to obtain the camera coordinate system $$O'_c$$

in a same direction as $X_w$, $Y_w$, and $Z_w$ axes of the arch bridge world coordinate system $O_w$, a first calculation expression is as follows:

$$\begin{bmatrix} X'_c \\ Y'_c \\ Z'_c \end{bmatrix} = [W_1]\begin{bmatrix} X_c \\ Y_c \\ Z_c \end{bmatrix}.$$

6. The infrared vision positioning method for the concrete pumping liquid level in the tube of the steel tubular arch bridge according to claim 5, wherein in the step 5, the translation transformation is performed on the camera coordinate system $$O_c'$$

to obtain a final camera coordinate system $$O_c'',$$

and a rotated camera coordinate system is translated to the front of the world coordinate system, wherein coordinates of n 3D points on the steel tubular arch bridge in the final camera coordinate system $$O_c''$$

are obtained when the infrared thermal imaging camera is orthorectified to the steel tubular arch bridge, a second calculation expression is as follows:

$$\begin{bmatrix} X_c'' \\ Y_c'' \\ Z_c'' \end{bmatrix} = [W_2] \begin{bmatrix} X_c' \\ Y_c' \\ Z_c' \end{bmatrix}.$$

7. The infrared vision positioning method for the concrete pumping liquid level in the tube of the steel tubular arch bridge according to claim 6, wherein in the step 7, default pixel coordinates of the origin of the world coordinate system and feature points of the steel tubular arch bridge are $(u_0, v_0)$ and $(u_i, v_i)$, respectively, the default pixel coordinate system $O_p$ is transformed to the pixel coordinate system $$O_p',$$

wherein the 2D pixel coordinates in the pixel coordinate system $$O_p'$$

correspond to the 2D orthographic projection coordinates one by one, a third calculation expression is as follows:

$$\begin{cases} u_i' = u_i - u_0 \\ v_i' = v_0 - v_i \end{cases}.$$

8. The infrared vision positioning method for the concrete pumping liquid level in the tube of the steel tubular arch bridge according to claim 7, wherein in the step 8 and the step 9, according to an one-to-one correspondence between the 2D pixel coordinates before and after a camera pose transformation, the perspective transformation matrix P is obtained, and the perspective transformation is performed on the arch bridge image taken by the infrared thermal imaging camera in the current frame, wherein an original oblique image is transformed into an orthographic projection of the arch bridge image.

9. The infrared vision positioning method for the concrete pumping liquid level in the tube of the steel tubular arch bridge according to claim 8, wherein in the step 12, the default pixel coordinate system $O_p$ is transformed into a liquid level coordinate system $O_l$ with the arch foot of the steel tubular arch bridge as the origin, and liquid level pixel coordinates after a coordinate transformation are multiplied by the image pixel scale, wherein the liquid level pixel coordinates are returned to real world coordinates, to feedback the mileage x and the elevation y of the liquid level, a fourth calculation expression is as follow:

$$\begin{cases} x = (u - u_0)S \\ y = (v_0 - v)S \end{cases}.$$

* * * * *